United States Patent

Okada

[15] 3,651,247

[45] Mar. 21, 1972

[54] VIDEO SIGNAL GENERATING APPARATUS

[72] Inventor: Takashi Okada, Tokyo, Japan

[73] Assignee: Sony Corporation, Tokyo, Japan

[22] Filed: May 27, 1970

[21] Appl. No.: 40,781

[30] Foreign Application Priority Data

May 31, 1969 Japan....................................44/42810

[52] U.S. Cl..........................................................178/5.4 ST

[51] Int. Cl...........................................................H04n 9/06

[58] Field of Search.....................178/5.2, 5.4, 5.4 ST, 5.4 S, 178/5.4 RC

[56] References Cited

UNITED STATES PATENTS 3,048,653 8/1962 Hughes....................................178/5.4

2,333,969 11/1943 Alexanderson.........................178/5.2

*Primary Examiner*—Richard Murray

*Attorney*—Lewis H. Eslinger, Alvin Sinderbrand and Curtis, Morris and Safford

[57] ABSTRACT

An illustrative embodiment of the invention converts two field-sequential color television signals to dot-sequential signals for combination into a composite color television signal. Through a feedback circuit connected to a field-sequential responsive image tube, a portion of the signal that characterizes one color is stored on the tube target while the image for another color is registered. This combined field sequential signal is taken from the target and is processed with another delayed field-sequential signal to provide two simultaneous dot-sequential signals.

6 Claims, 14 Drawing Figures

INVENTOR

TAKASHI OKADA

BY

ATTORNEYS

INVENTOR.
TAKASHI OKADA
BY
ATTORNEYS

INVENTOR:

TAKASHI OKADA

BY

ATTORNEYS

VIDEO SIGNAL GENERATING APPARATUS

BACKGROUND OF THE INVENTION

FIELD OF THE INVENTION

This invention generally relates to signal generating apparatus, and more particularly to a color video signal generating apparatus which employs an image converter capable of storing signals to produce, for example, a dot-sequential color video signal converted from field sequential images picked up on the tube, and the like.

SUMMARY OF THE PRIOR ART

There are several practical color television systems. The "dot-sequential" technique, for example, is the standard domestic color television system in the United States. Ordinarily, three expensive image pickup tubes of the vidicon type, for example, are required for color television signal generation when used in connection with this system. Each of the tubes simultaneously responds to a respective one of the basic red, blue and green colors.

In contrast, the "field-sequential" color television technique may use one image pickup tube. In this system, color signals are generated by passing in order red, blue and green filters before the light input to a single vidicon tube in order to establish a regular time sequence of output signals that are related to the different color images. As a practical matter, the dot-sequential and field-sequential techniques usually are considered to be so distinct that there is almost no way in which the features of both of these systems can be combined, for instance, to reduce color filter system coil and the number of image pickup tubes required in the customary dot-sequential color video signal generating apparatus.

Accordingly, the need to reduce the cost and complexity of dot-sequential color video signal generating equipment remains unsatisfied in many respects.

SUMMARY OF THE INVENTION

In accordance with the present invention, a device is provided that alleviates the complexities of dot-sequential color video signal generating apparatus by adopting and combining some of the features of the field-sequential system. More particularly, an image pickup tube, of which the "vidicon" is typical, is provided with a signal feedback means. The feedback means constitutes a signal storage device which, for example, converts a field-sequential color video signal into a dot-sequential color video signal for producing a color television signal.

Accordingly, one object of this invention is to provide a color video signal generating apparatus in which an image pickup tube is provided with feedback means to constitute a simple-structured signal storage device for producing a stored color video signal output.

Another object of this invention is to provide a color television signal generating apparatus employing feedback means for signal storage.

Still another object of this invention is to provide a simple and inexpensive dot-sequential color television signal generating apparatus.

Other objects, features and advantages of this invention will become apparent from the following description taken in conjunction with the accompanying drawings.

BRIEF DESCRIPTION OF THE DRAWINGS

FIGS. 4A to 7C are diagrams, to aid in understanding the invention.

DESCRIPTION OF THE PREFERRED EMBODIMENTS

With reference to the drawings, a description will be given of an example of the signal storage device of this invention.

Figure 1:
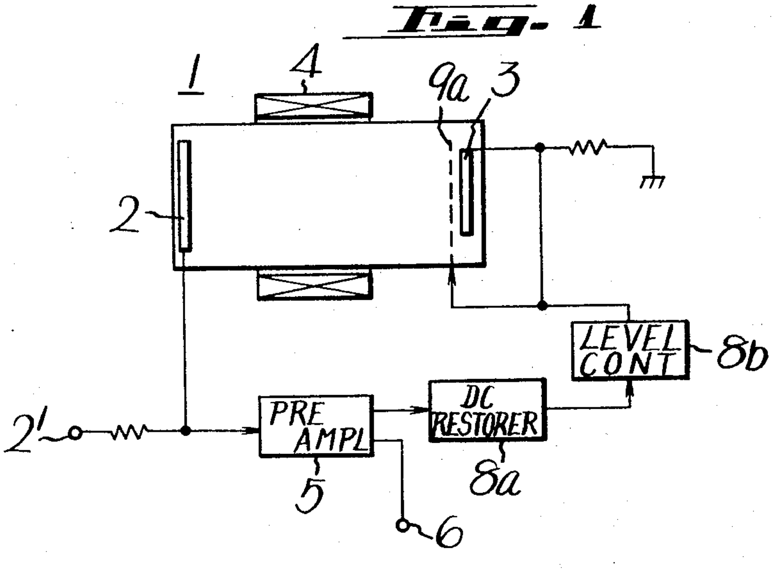
FIG. 1 is a schematic diagram showing one embodiment of a signal storage device illustrative of the principles of this invention.

In FIG. 1 an image pickup tube 10 of substantially the same construction as a vidicon or other tube of this sort, has a target structure 11. The target structure has a photoconductive layer that is supplied with a working voltage from a power supply 12. The target 11 is located adjacent to one end of the tube 10. The tube 10 also has a cathode 13 for emitting an electron beam that scans the target structure 11. The cathode 13, moreover, is disposed adjacent to the end of the tube that is remote from the target structure 11. A deflection device 14, which may be of the conventional magnetic type, causes the electron beam emitted from the cathode 13 to scan the target structure 11 horizontally and vertically in a predetermined pattern.

In accordance with the present invention the image pickup tube 10 feeds the output from the target structure 11 back to the cathode 13 through a path that includes a preamplifier 15, a DC restorer circuit 16, a level adjustment circuit 17 and a conductor 20. Because the feedback signal might produce an increase in the potential on the cathode 13, and thereby cause undesirable beam modulation, it is preferable to apply the feedback signal from the level adjustment circuit 17 also to an image pickup tube grid 21, in order to avoid modulating the beam.

For a more complete appreciation of the invention, assume that the target structure 11 is held at a potential Y, in response to the stimulation caused by the light from an object to be televised. Further assume that a signal $a$Y ($a$ being an attenuation constant and smaller than 1) is fed back to the cathode 13 through the preamplifier 15, the DC restorer circuit 16 and the level adjustment circuit 17. Inasmuch as the target structure 11 is scanned by the electron beam emitted from the cathode 13, and the electron beam is supplied with the signal $a$Y, the target potential Y necessarily is reduced to $a$Y. The signal that is derived at the output terminal 22 is $Y - aY$, or $(1 - a)Y$. Consequently, a signal $a$Y is stored in the target structure 11 by the scanning electron beam. Subsequent electron beam scanning applies a signal $a^2Y$ to the cathode 13 which results in a signal $a(1 - a)$ Y at the output terminal 22. Accordingly, the output signal is attenuated each time the target structure 11 is scanned, but a signal storage effect is provided in principle and the stored signal can be picked up. This invention is of particular utility when one storing operation is sufficient.

Figure 2:
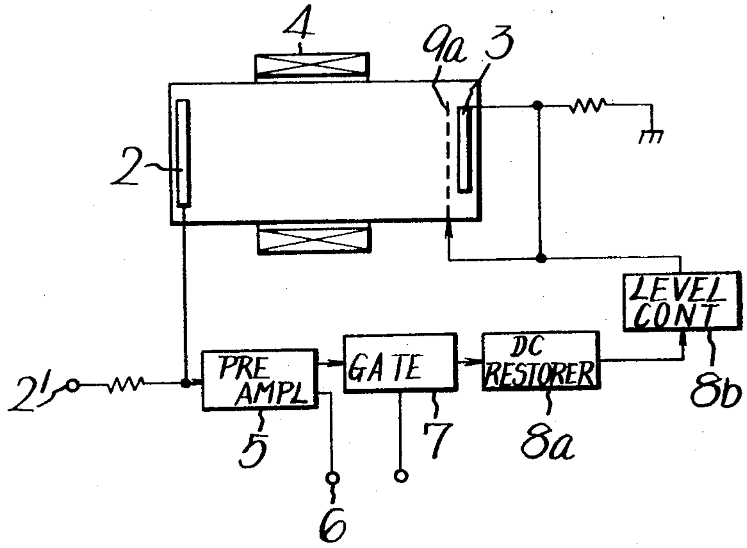
FIG. 2 is a schematic diagram, similar to FIG. 1, showing a modified form of the signal storage device that characterizes this invention.

FIG. 2 shows a circuit for storing only a portion of the output signal on the target structure 11 by gating the desired portion of the output signal through a gate circuit 23 that is connected between the preamplifier 15 and the DC restorer circuit 16.

Thus, the present invention provides a signal storage device of simple construction in which a signal can be stored and then picked up as a video signal.

Figure 3:
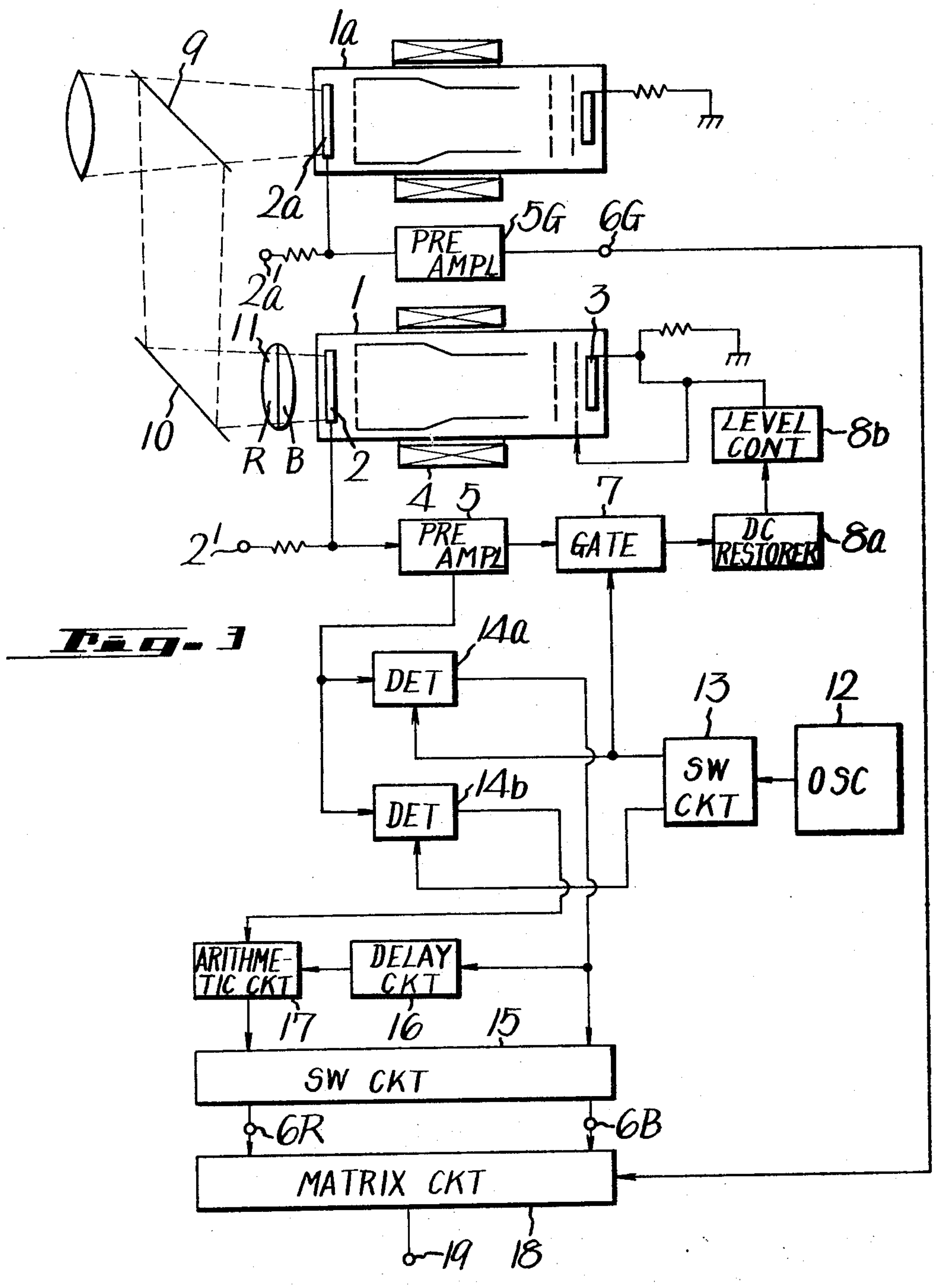
FIG. 3 schematically illustrates one embodiment of a color television signal generating apparatus in accordance with the invention.

FIG. 3 shows an illustrative example of the color video signal generating apparatus that employs the signal storage device characterizing this invention. In the figure similar elements to those in FIGS. 1 and 2 are identified by the same reference numerals and will not be described in detail. The illustrated color video signal generating apparatus employs two image pickup tubes 10 and 10$a$. In the arrangement shown, only a green color signal G is derived from the image pickup tube 10$a$. Field-sequential red and blue color signals R and B are derived from the other image pickup tube 10. The dot-sequential red and blue color signals R and B, moreover, are to be derived from the field-sequential color video signals.

To this end, a dichroic mirror 24 passes the green components of the input color and inhibits the passage of the other color components. The mirror 24 is disposed in front of the image pickup tube 10$a$ and is inclined at an angle of about 45 degrees to the target structure 11*a* of the image pickup tube 10*a*. The reflected light from the dichroic mirror 24 is directed by a mirror 25 to the target structure 11 of the image pickup tube 10 through a rotary color filter 26. The rotary filter 26 is made up of red and blue color filter elements R and B, respectively, and is driven in synchronism with a field signal. This produces at the output terminal of the target structure 11 a field-sequential color signal in which the red and blue color signals R and B repeat one after the other at every field.

The output of the target structure 11 is fed back to the cathode 13 through the preamplifier 15, the gate circuit 23, the DC restorer circuit 16 and the level control or adjustment circuit 17. In this case the signal fed back to the cathode 13 is adjusted by the level adjustment circuit 17 to be of such a level that the signal derived at the output of the target structure 11 is attenuated by half, that is, the forementioned attenuation constant *a* is equal to one-half.

Oscillator 27 has a frequency which is an integral number of times as large as the horizontal scanning frequency, for example, 15.75 kHz. In this case an increase in the oscillator frequency causes an increase in horizontal resolution. The oscillator 27, moreover, produces a rectangular sampling signal as depicted for instance in FIG. 4*a*, which has a period T. The output of the oscillator 27 is applied as a gate signal to the gate circuit 23 through a switching circuit 30.

Figures 4A, 4B, 5A, 5B, 5C, 6A, 6B, 6C, 7A, 7B, 7C:
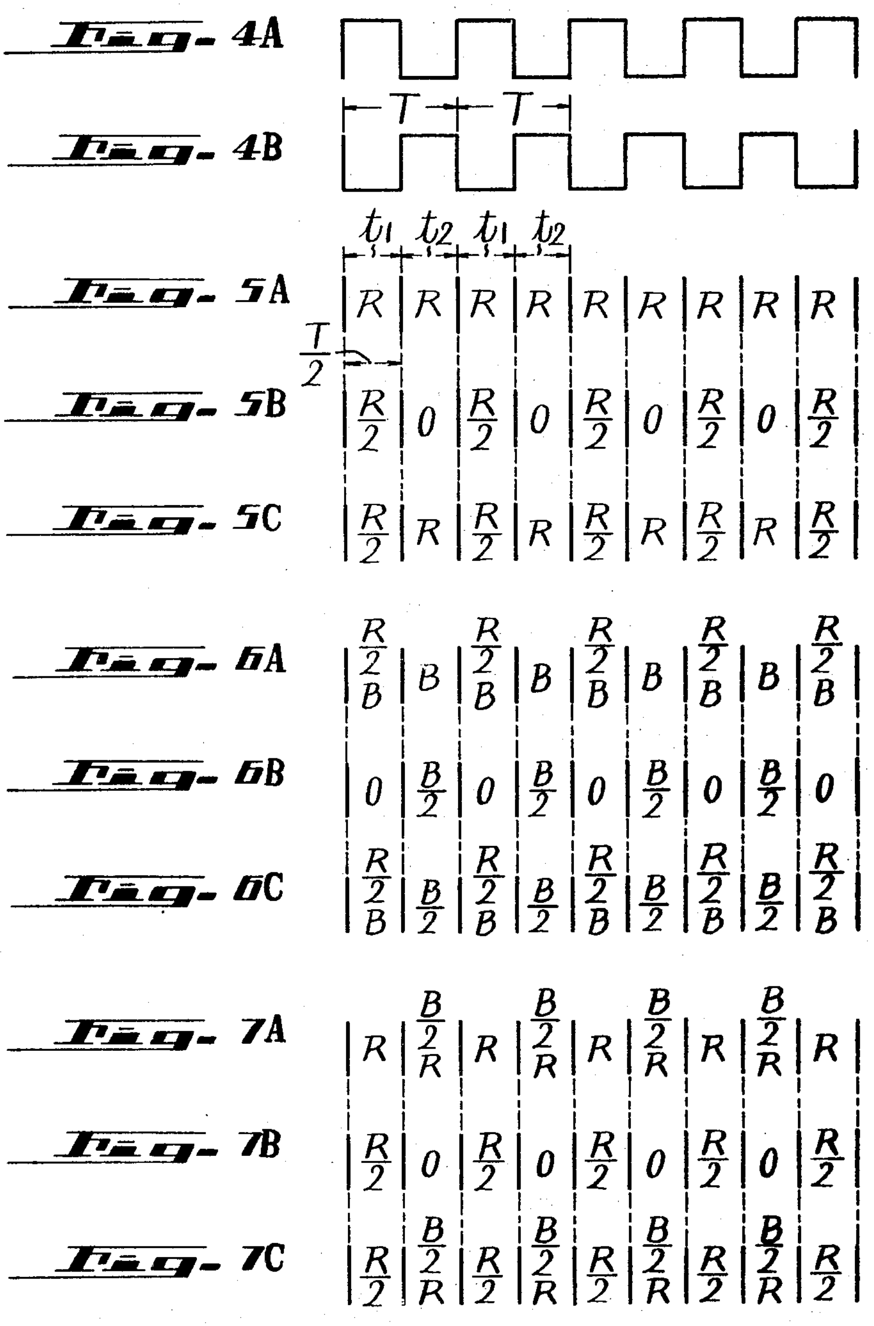

The switching circuit 30 is adapted to reverse the phase of the gate signal at every field in synchronism with the field signal as shown in FIGS. 4A and 4B. Illustratively, in the red color signal field, the gate circuit 23 is supplied with the gate signal depicted in FIG. 4A. In the blue color signal field, the gate circuit 23 is supplied with the gate signal shown in FIG. 4B which is 180° out of phase with the signal shown in FIG. 4A.

The output of the preamplifier 15 is applied to synchronous detector circuits 31 and 32, which are also supplied with the signals such as shown in FIGS. 4A and 4B from the switching circuit 30. The output of the synchronous detector circuit 31 is fed to a switching circuit 33 and to an arithmetic circuit 34 through a ½T delay circuit 35, while the output of the synchronous detector circuit 32 is also applied directly to the arithmetic circuit 34. The output of the arithmetic circuit 34 is supplied to the switching circuit 33. The switching circuit 33, moreover, is adapted to be changed over at every field to establish the red and blue color signals R and B at output terminals 36 and 37, respectively. In FIG. 3 a green color signal preamplifier 15G produces a green color signal G at output terminal 22G. The outputs derived at these terminals 36, 37 and 22G are all applied to a resistance network or matrix circuit 40 that combines the outputs in an appropriate manner in order to generate at output terminal 41 a composite color television signal.

For illustrative purposes, an ordered sequence of red, blue and red field exposures now will be described in connection with the invention. When exposure of the target structure 11 to red light through the rotary color filter 11 has just been completed, the target structure 11 is held at a potential of the red signal R as shown in FIG. 5A. By way of explanation, in FIGS. 5, 6 and 7 the periods $t_1$ and $t_2$ are each ½ of the period of the signal from the oscillator 27 as indicated by ½T and reference character R indicates the red color signal, B the blue color signal and O the absence of the signal. At this time the gate circuit 23 is supplied with the gate signal such as depicted in FIG. 4A. Consequently, the cathode 13 of the image pickup tube 10 is supplied with a repeating signal such as shown in FIG. 5B which includes a ½ red color signal ½R in the first period $t_1$ and no signal in the second period $t_2$ as indicated by O when the gate circuit 23 is disabled in response to this respective portion of the gate signal in FIG. 4A. As a result of this, the preamplifier supplies the synchronous detector circuits 31 and 32 with a repeating signal such as shown in FIG. 5C which includes the ½ red color signal ½R in the first period $t_1$ and the red color signal R in the second period $t_2$. At this time the potential of the target structure 11 is altered into such as shown in FIG. 5B.

For convenience of explanation, let it be assumed that the dark current and the beam impedance are sufficiently low and that the subsequent field is not affected by a change in the amount of the signal stored and the residual image. Then, when exposure of the target structure 11 to blue light has been completed, the target structure 11 is held at potentials such that the first period $t_1$ including ½ red color signal ½R and the blue color signal and the second period $t_2$ including the blue signal B repeat one after the other as shown in FIG. 6A. The ½R signal was stored on the target structure 11 in order to be mixed with the B signal through the feedback memory feature of the invention.

At this time the signal depicted in FIG. 4B is fed as a gate signal to the gate circuit 23, so that the signal applied to the cathode 13 of the image pickup tube 10 becomes a repeating signal as shown in FIG. 6B which includes no signal in the first period $t_1$ and a ½ blue signal ½B in the second period $t_2$. As a result of this, the preamplifier 15 supplies the synchronous detector circuits 31 and 32 with a repeating signal such as illustrated in FIG. 6C which consists of the ½ red color signal ½R and the blue color signal B in the first period $t_1$ and the ½ blue color signal ½B in the second period $t_2$. Thus, the synchronous detector circuits 31 and 32 are supplied with dot-sequential signals B+R/2, B, B+R/2, B, ..... and the synchronous detector circuit 31 produces at its output terminal signals B/2, O, B/2, ......, while the other synchronous detector circuit 32 produces at its output terminal signals O, R/2+B, O, R/2+B, O, ....

Accordingly, if the signal produced by the synchronous detector circuit 31 is delayed by ½T and is applied to the arithmetic circuit 34 to achieve an operation $[R/2+B - 2(B/2)] = R/2$, dot-sequential signals B/2, R/2, B/2, R/2, ... are derived at the output terminal of the switching circuit 33. At this time, the target structure 11 is held at a potential such as depicted in FIG. 6B. When subsequent exposure of the target structure 11 to red light has been completed, the target structure 11 is held at such potentials that the first period $t_1$ including the red color signal R and the second period $t_2$ including the ½ blue color signal ½B and the red signal R repeat one after the other as depicted in FIG. 7A.

At this time the gate signal shown in FIG. 4A is supplied to the gate circuit 23 so that the signal fed to the cathode 13 of the image pickup tube 10 becomes a repetitive signal such as illustrated in FIG. 7B which includes the ½ red color signal ½R in the first period $t_1$ and no signal in the second period $t_2$. As a result of this, the preamplifier 15 supplies the synchronous detector circuits 31 and 32 with a repetitive signal such as depicted in FIG. 7C which consists of the ½ red color signal ½R in the first period $t_1$ and the ½ blue color signal ½B and the red color signal R in the second period $t_2$. In this manner, the synchronous detector circuits 31 and 32 are supplied with dot-sequential signals R/2, R+B/2, R/2, ... and the synchronous detector circuit 31 produces at its output terminal signals R/2, O, R/2, O ..., while the other synchronous detector circuit 32 produces at its output terminal signals O, B/2+R, O, B/2+R, ....

Accordingly, if the signal produced by the synchronous detector circuit 31 is delayed by ½T and is applied to the arithmetic circuit 34 to achieve an operation $[B/2+R - 2(R/2)] = B/2$, dot-sequential signals B/2, R/2, B/2, R/2, .... are obtained at the output terminal of the switching circuit 33. At this time, the target structure 11 is held at a potential such as shown in FIGS. 5B and 7B. Thereafter, the above operations are sequentially repeated, by which the dot-sequential signal consisting of the red and blue color signals R and B is derived at the output terminal of the switching circuit 33. The green signal, as shown in FIG. 3, is applied directly to the matrix circuit 40 for combination with the now dot-sequential red and blue signals. Consequently, excellent composite color television signals can be derived at the output terminal 41 from the red, blue and green color signals R, B and G produced at the output terminals 36, 37 and 22G.

With the arrangement illustrated in FIG. 3, dot-sequential color television signals can be produced without an expensive and difficult to produce color filter system. Further, all the phases of the dot-sequential color television signals are controlled through the oscillator 27, so that the circuit for reproducing the color television signals need not conform to strict characteristics. Simplified circuit construction and inexpensive color television camera manufacture necessarily follow from the principles of this invention.

It will be apparent that many modifications and variations may be effected without departing from the scope of the novel concepts of this invention.

I claim:

1. A video signal generating apparatus comprising an image pickup tube having a target structure photoelectrically converting light projected thereto into a signal, electron beam generating means for applying an electron beam to said target structure to scan the surface thereof, means for applying a voltage to said target structure, means for picking up said signal from said target structure, means for controlling said signal to a predetermined value, means for applying part of said controlled signal of predetermined value to said electron beam generating means to store part of said controlled signal on said target structure, and means for deriving from said target structure a video output signal including said stored signal.

2. A video signal generating apparatus as claimed in claim 1 which includes DC restorer means for adding a DC component to said part of said controlled signal applied to said electron beam generating means.

3. A video signal generating apparatus as claimed in claim 1 wherein said electron beam generating means comprises a cathode electrode and at least one grid electrode responsive to said controlled signal of predetermined value.

4. A video signal generating apparatus as claimed in claim 1 which includes signal gating means for selectively applying said controlled signal from said target structure to said electron beam generating means.

5. A video signal generating apparatus comprising an image pickup tube having a target structure for photoelectrically converting light projected thereto into a signal, means for generating an electron beam for application to said target structure to scan the surface thereof, a color filter consisting of a plurality of color filter elements through which respective color components of light pass to said target structure, means for picking up a signal from said target structure, means for feeding one part of said signal back to said electron beam generating means to modulate the signal on said target structure through said beam to store part of said signal on said target structure, said feeding back means controlling the signal from said target structure to a predetermined value, means for selectively gating said signal part, means for picking up said photoelectric signal including said stored signal from said target structure, means for detecting said picked up signal to produce respective color video signal components in response to said selective gating means, and means for producing a composite color video signal from said respective color video signal components.

6. A video signal generating apparatus comprising a first image pickup tube having a target structure photoelectrically converting light projected thereto into a signal and means for applying an electron beam to said target structure to scan the surface thereof, a color filter consisting of a plurality of color filter elements through which respective color components of light pass to said target structure to produce a photoelectric signal thereon, means for taking a signal from said target structure, means for feeding one part of said target structure signal back to said electron beam generating means to modulate the voltage of said target structure through said electron beam to store said fed back signal on said target structure, said feedback means controlling said target structure signal to a predetermined value, means for selectively gating said target signal, means for detecting said target signal to produce respective color video signal components in response to said selective means, means for producing a composite color video signal from said respective color video signal components, a second image pickup tube having a target structure photoelectrically converting light projected thereto into a signal, and means for applying an electron beam to said second image pickup tube target structure to scan the surface thereof, said second image pickup tube producing another video signal for application to said composite color video signal producing means.

* * * * *